United States Patent [19]

North

[11] Patent Number: 5,505,020
[45] Date of Patent: Apr. 9, 1996

[54] SINGLE PLANT GREENHOUSE

[76] Inventor: Keith North, 3074 W. Danube Dr., Salt Lake City, Utah 84118

[21] Appl. No.: 399,942

[22] Filed: Mar. 6, 1995

[51] Int. Cl.⁶ .................................................. A01G 13/00
[52] U.S. Cl. ............................................. 47/30; 47/21
[58] Field of Search ........................... 47/26 R, 28.1 R, 47/28.1 C, 21 A, 30 OT

[56]  References Cited

U.S. PATENT DOCUMENTS

| | | |
|---|---|---|
| 2,063,822 | 12/1936 | Muller . |
| 2,226,812 | 12/1940 | Goldberg . |
| 3,812,616 | 5/1974 | Koziol . |
| 3,896,586 | 7/1975 | Caldwell . |
| 3,995,396 | 12/1976 | Spector . |
| 4,137,667 | 2/1979 | Wallace et al. . |
| 4,267,665 | 5/1981 | Wallace et al. . |
| 4,392,326 | 7/1983 | Boria . |
| 4,711,051 | 12/1987 | Fujimoto . |
| 4,821,453 | 4/1989 | Morehead . |

FOREIGN PATENT DOCUMENTS

| | | | |
|---|---|---|---|
| 574720 | 12/1993 | European Pat. Off. | ............... 47/21 A |
| 525 | 12/1874 | Italy | ....................... 47/21 A |

Primary Examiner—Henry E. Raduazo
Attorney, Agent, or Firm—Thorpe, North & Western

[57] ABSTRACT

A single plant greenhouse that is a single unit of rigid material with adjustable access ports, wherein the greenhouse provides a thermal buffer against harsh environmental conditions while enabling access to the greenhouse interior to provide ventilation, viewing and caring for a plant while maintaining a sheltered environment that can gradually be removed, allowing the plant to gradually harden itself to the outside environment without shock.

10 Claims, 4 Drawing Sheets

SINGLE PLANT GREENHOUSE

BACKGROUND OF THE INVENTION

1. Field of the Invention

This invention pertains to a plant enclosure device, and more particularly to a greenhouse that protects a single plant, or group of small plants, from harsh environmental conditions, but still allows access to the plant for watering, fertilizing and other gardening functions, and furthermore can be modified to allow a plant to slowly transition to being open to the environment so as to allow the plant within to harden without shock while potentially in a vulnerable condition.

2. Prior Art

It has long been known to be desirable to protect plants in seasonal climates from cold and other environmental factors at the ends of the growing season. In so doing, a person can effectively extend the usable life of plants and consequently enhance yield. This is desirable with regard to many planting schemes. Throughout this Application the term "plant" should be understood to mean a single plant or a group of plants planted immediately ajacent to each other in a "hill."

The prior art has many examples of plant greenhouses designed to protect young plants from the environment. Indeed, there is great motivation for finding a device that will enable a user or gardener to do more than simply protect young plants. While protection of plants from adverse conditions has been understood, the prior art has failed to address many problems introduced by enclosure of the plant. In many instances "the solution has been worse than the cure." Prior activity has not resulted in a plant protection system until now that provides all of the advantages of the present invention.

To thoroughly appreciate the innovations encompassed within the new design to be disclosed, it is necessary to understand the motivation and needs of the user, and where prior art systems have fallen short.

To begin, a user who desires to protect individual plants wants more than a greenhouse which seals out the environment. While necessary, a user also needs easy access. Plants often need nurturing that requires a user to add water or fertilizer. However, often overlooked is the need to get even closer with hands or other tools. Such access should not come at the cost of shocking a young plant when the entire greenhouse is removed for hand or tool access or when it's full protection is not desirable. Variable access would enable a user to limit and vary exposure of a plant within to environmental factors such as temperature and humidity. U.S. Pat. Nos. 2,063,822 (Muller) and 3,896,586 (Caldwell) are typical of rigid greenhouses that prevent easy access to plants.

Access should also be considered in terms of simply viewing the plant. Easy viewing enables a user to more accurately assess the plant's condition. However, as a plant grows, it will fill more of the greenhouse. Therefore, viewing access should be modifiable depending upon the size of the plant within, when using a translucent greenhouse. Several prior art greenhouses illustrate either a lack of modifiable viewing access such as in U.S. Pat. No. 4,821,453 (Moorehead), or very limited access such as in U.S. Pat. No. 2,226,812 (Goldberg).

Finally, access should also be considered in terms of the plant's need for ventilation when appropriate. Ventilation should also be modifiable according to ever changing environmental conditions.

A greenhouse should also be lightweight and inexpensive when constructed to house individual plants because of the desired potential of covering many plants in a cost effective manner. Prior art systems such as Wallace with U.S. Pat. Nos. 4,137,667 and 4,267,665, and Moorehead are designed to be lined with water to create a thermal buffer that warms the plant with retained heat when it is cold outside. However, these systems are unnecessarily heavy and can be time consuming to set up, as well as to keep standing. It is possible to have thermal retention to maintain a warmer environment for a plant without resorting to a water-lined greenhouse. Water-lined greenhouses are combersome and floppy, and require great care to insure that they do not fall over and crush the plants desired to be protected. Water-lined greenhouses introduce maintence problems associated with filling, re-filling, and adjusting water levels.

A greenhouse also requires anchoring to prevent them from blowing away, and accidental tipping, thus exposing the plant to harsh conditions at the worst of times. While the device could be made heavier to prevent this, a lightweight device is easier to handle by the user, especially when multiple greenhouses are being set-up and later stored. Using soil to anchor the greenhouse enables a greenhouse to be lighter, while taking advantage of plentiful anchoring materials surrounding it.

Many prior art greenhouses have been crude enclosures of, for example, paper caps. While inexpensive, they can not provide all the features mentioned above and are often wasted after one, or less, seasons. Therefore, if reusable, a cost effective greenhouse must also be easy to store, rigid in order to protect itself from rough handling and to make it stackable for more compact storage, and should come as a single piece for convenience and portability.

Finally, transitioning of a plant from a covered to a physically unprotected state can shock plants. The shock can delay growth and produce a weaker plant more susceptible to disease or insects. Greenhouses in the prior art substantially lack the ability to adequately transition plants. A better greenhouse allows for more gradual hardening of a plant as it is introduced by phases into the environment.

Therefore, it would be an advantage over the prior art to provide a single plant greenhouse that can enable a user to have an entirely rigid, single piece greenhouse that is reusable, inexpensive, provides easy and adjustable ventilation, viewing and tool and hand access, be anchorable to the soil to prevent inadvertent uncovering of a vulnerable plant, be stackable for easy storage, and enable better transitioning of a plant to a hardened and healthy state.

OBJECTS AND SUMMARY OF THE INVENTION

It is therefore an object of the present invention to provide a method and apparatus for protecting young plants from environmental conditions such as harsh weather and insects while the plant is young and particularly vulnerable.

It is another object of the present invention to provide an apparatus for enclosing a young plant and the surrounding soil enabling retention of thermal energy to provide protection from the cold.

It is yet another object to provide an apparatus enabling smoother transitioning that allows a plant to harden itself to the environment at a gradual pace.

It is still another object of the present invention to provide an apparatus enabling easy access without undue exposure of the young plant.

It is a further object to provide an apparatus enabling modifiable viewing and ventilation access depending upon environmental conditions, and the amount of access required.

Yet a further object of the present invention is to provide an apparatus for protecting young plants that is inexpensive, lightweight, rigid, reusable and easily stackable for storage.

Still a further object is to provide an apparatus for protecting young plants that uses an anchoring scheme that is simple to implement but provides effective resistance to environmental forces that could overturn the apparatus.

Finally, it is an object of the present invention to provide a single unit greenhouse that eliminates the need for keeping track of various components that can become lost.

These and other objects not specifically recited are realized in a single plant shelter or greenhouse as it will be referred to hereinafter, made of a rigid material having adjustable access ports that enable access to the greenhouse interior, but maintain a sheltered environment. One of the advantages of adjustable access ports is that when access ports are removable, a user can gradually reduce the protection around the plant. This gradual change gives the plant time to adjust or "harden" itself during this transition to being unprotected.

Also disclosed is a method for protecting and nurturing a single plant, and includes the steps of (i) providing a single, rigid greenhouse with removable access ports, (ii) anchoring said greenhouse by covering the peripheral edges with soil, (iii) sealing the access ports to prevent damage to the plant inside from harsh environmental conditions and insects, (iv) opening access ports as required to add water or fertilizer, and to reach in with hands and tools to provide whatever close proximity care is needed.

Also disclosed is a method for transitioning a single plant from a protected environment to an unprotected state, and includes the steps of (i) providing a single, rigid greenhouse with removable access ports, (ii) anchoring said greenhouse by covering the peripheral edges with soil, (iii) removing access ports in stages to allow a gradual environmental change within the greenhouse, (iv) removing the greenhouse from around the plant when the plant has sufficiently hardened to the outside environmental conditions.

DETAILED DESCRIPTION OF THE INVENTION

Figure 1:
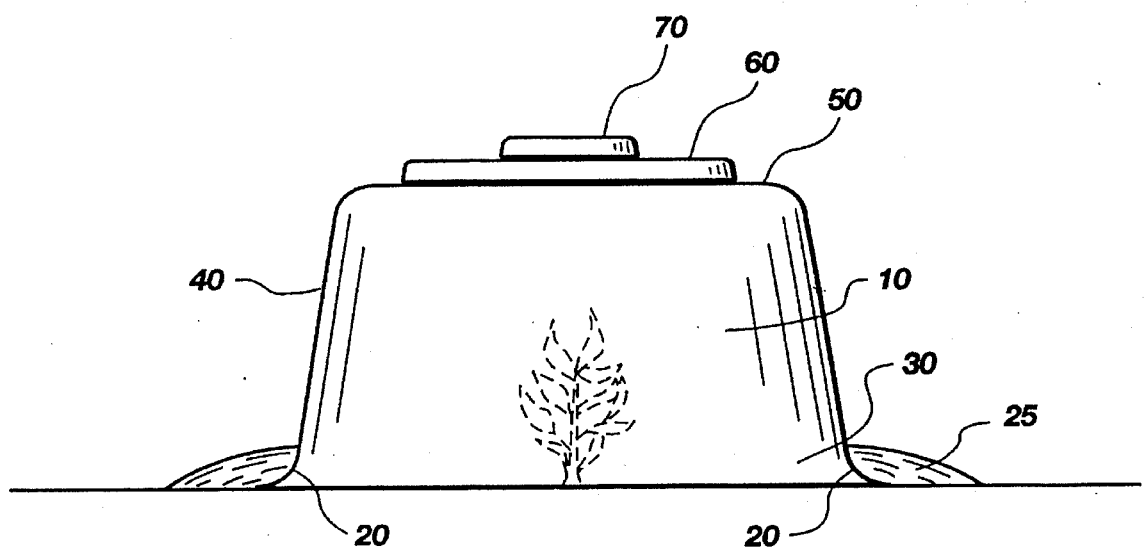
FIG. 1 is a plan view of the single plant greenhouse made in accordance with the present invention.

FIG. 1 illustrates the general physical elements of the preferred embodiment of the present invention. The greenhouse, indicated generally by the indicator 10, can be easily described as having the shape of an overturned pot or truncated cone. The greenhouse 10 forms a protective environment inside of which a young plant is protected from outside elements. All around the base 30 of the greenhouse is a lip 20 turned outward from the hollow greenhouse interior. Around the lip 20 soil 25 is moved to cover the lip edge, thereby anchoring the greenhouse around the plant and preventing inadvertent exposure of the plant within. The outer wall 40 of the greenhouse is generally slanted, being wider at the base 30 and gradually sloping inward and upward to a first top surface 50. By giving the outer wall a gradual slant, a plurality of greenhouses can be stacked on each other for easy storage. On the first top surface 50 and generally positioned in the middle is a first access port 60. On top of the first access port 60 and generally positioned in the middle is a second access port 70. The first access port 60 is circular and smaller in diameter than the top surface 50 of the greenhouse. Likewise, the second access port 70 is circular and smaller in diameter than the first access port 60. Access port 60 extends upward from the top surface 50 so that it can be grasped and moved to allow access to the greenhouse interior. Access port 70 extends upward from the first access port 60, and can be grasped and moved independently of access port 60 to allow more limited access to the greenhouse interior.

Although only two access ports are herein described, an obvious variation is to have a plurality of differently sized access ports, depending upon the degree of access required. A plurality of access ports provides the advantage of more gradually exposing the warmer and protected environment within the greenhouse to the colder environment outside. The purpose of changing the environment inside the greenhouse is to prepare the plant for its complete removal. By slowly changing the inside environment, the plant can make the physiological adjustments required to "harden" itself, and prepare for exposure to harsher conditions. The prior art greenhouses are ill-suited to allow this gradual environmental change because most do not provide adjustable ventilation. Those that can adjust ventilation are either difficult to use, or lack other important advantages of the present invention.

Figure 2:
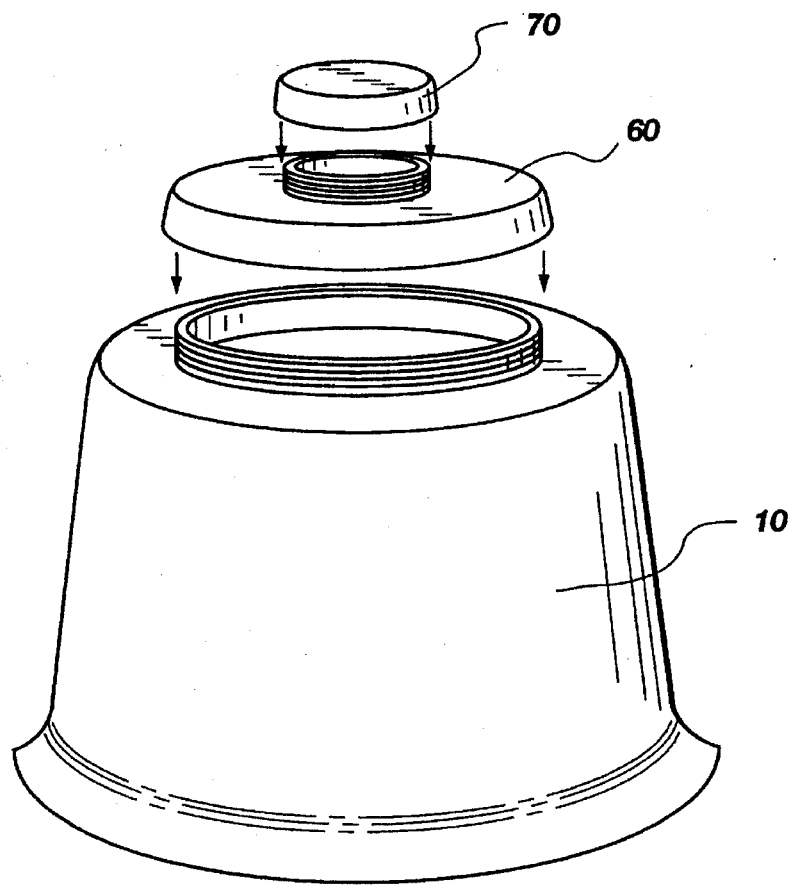
FIG. 2 is a perspective view of the invention illustrated in FIG. 1.

FIG. 2 is a perspective view of the present invention. As seen more clearly, the greenhouse 10 resembles a hollow truncated cone with no bottom, but a top surface with a channel cut through to the interior. On the top of the greenhouse 10 covering the channel are the access ports 60 and 70. It should be observed that the greenhouse 10 is a single unit with removable parts. In the preferred embodiment, access ports 60 and 70 are removable, but easily reattached for storage so that no parts are lost. As will be disclosed herein, the access ports 60 and 70 can be attached in a manner that does not allow their complete removal from the greenhouse 10, rather they can be sufficiently moved to allow the access required.

The greenhouse is shown with both access ports 60 and 70 removed. It should be apparent from the illustration that access port 70 may be removed from access port 60 independent of whether access port 60 is in threaded engagement with the greenhouse 10. Thus, if water or fertilizer can be added through access port 70, only access port 70 is removed, thereby minimizing the influence of the outside environment on the environment inside the greenhouse. This serves to reduce the chance of causing a shock to the plant inside. However, if greater ventilation, view or care must be provided for the plant, then access port 60 is removed and access port 70 is left in threaded engagement with access port 60. The user is thus provided with varying degrees of access, depending upon the task to be performed.

Figure 3A:
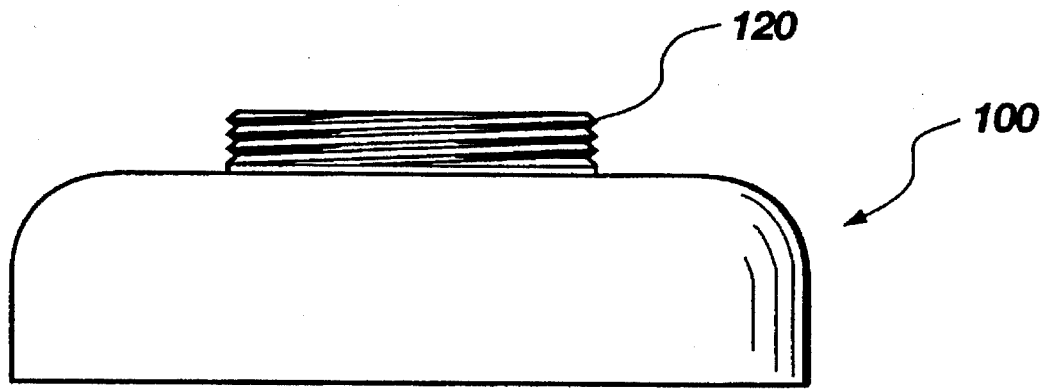
FIG. 3A is a close up view of the preferred embodiment for an access port made in accordance with the present invention in FIG. 1.

FIG. 3A is a closeup view of the preferred embodiment for an access port 100. While there are several embodiments whereby the access ports can be partially or totally removed from the greenhouse to allow ventilation, access for watering, fertilizing, reaching in with hands and other tools, and checking on the health of the plant, the preferred embodiment is an access port coupled to the greenhouse or another access port by a threaded engagement. In effect, each access port 100 is a large bolt with threads that engage threads on the connecting greenhouse top surface or access port. Twisting or rotating the access port 100 in one direction creates a tight seal with the greenhouse. Twisting in the opposite direction will remove the access port 100.

Figure 3B:
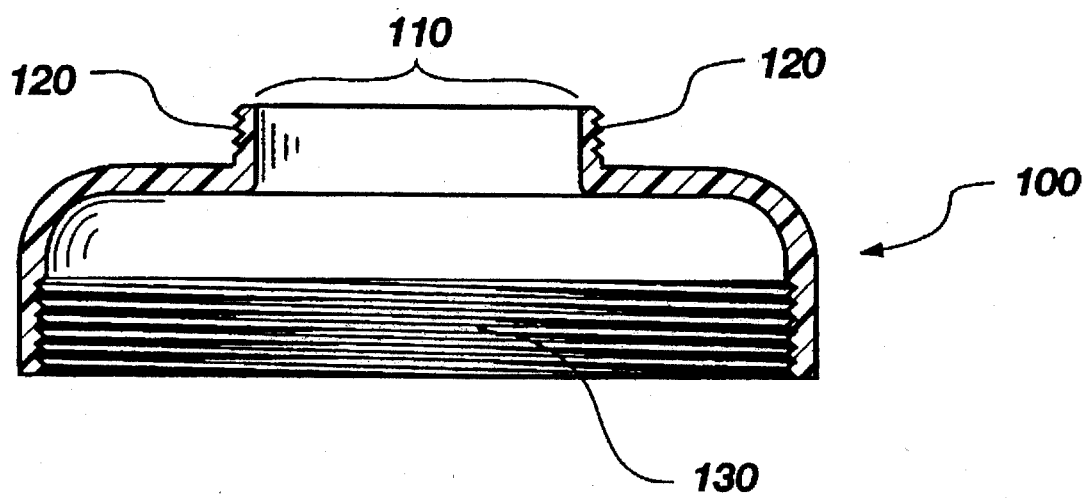
FIG. 3B is a cut-away view of the access port shown in FIG. 3A.

FIG. 3B is a cut-away view of the access port 100 of the present invention illustrated in FIG. 3. The particular access port 100 depicted is not a topmost access port because there is a circular hole 110 in the top center of the access port 100. Threads 120 are provided along the outer side of a channel 110 for engaging threads of another access port (not shown). Threads 130 are formed on the inner circumference of the access port 100 for coupling in threaded engagement with a next access port or the top surface of the greenhouse (not shown).

Figure 4:
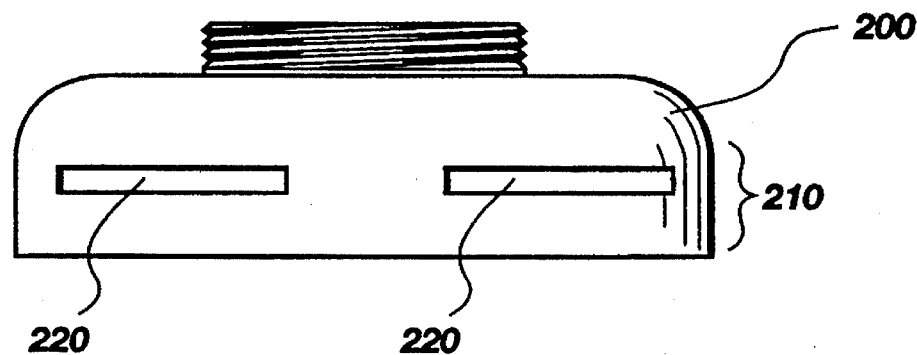
FIG. 4 is an alternative embodiment for an access port that allows ventilation of the greenhouse interior without removing the access port.

FIG. 4 is an alternative embodiment of the present invention. Particularly, the engagement threads 210 for sealing an access port 200 to the top of the greenhouse or to a larger access port (not shown) is modified so that the access port 200 does not need to be entirely removed to achieve ventilation of the greenhouse interior. As shown, the threaded engagement area 210 of an access port is perforated with long horizontal slots 220. These perforations 220 allow a limited amount of environmental exposure when access port 200 is only partially unscrewed. A plurality of access ports could be likewise partially unscrewed exposing more ventilation slots, increasing exposure to the outside environment.

Figure 5A:
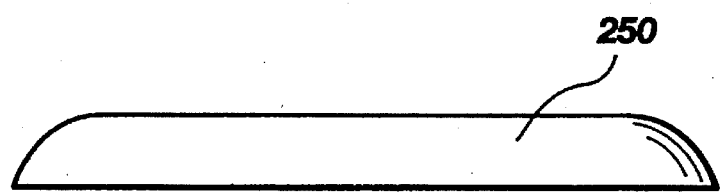
FIG. 5 is an alternative embodiment for an access port.
Figure 5B:
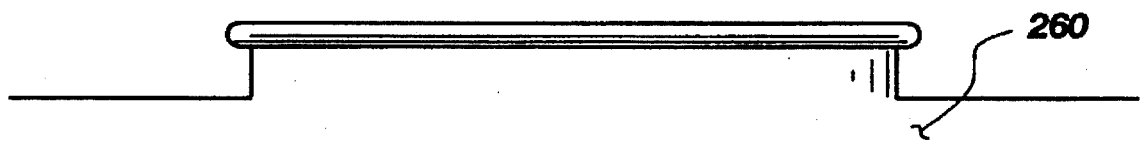

FIG. 5 is another alternative embodiment for an access port in the present invention. A snap-on lid arrangement replaces the threaded engagement to seal the access port 250 to the greenhouse or another access port 260.

Figure 6:
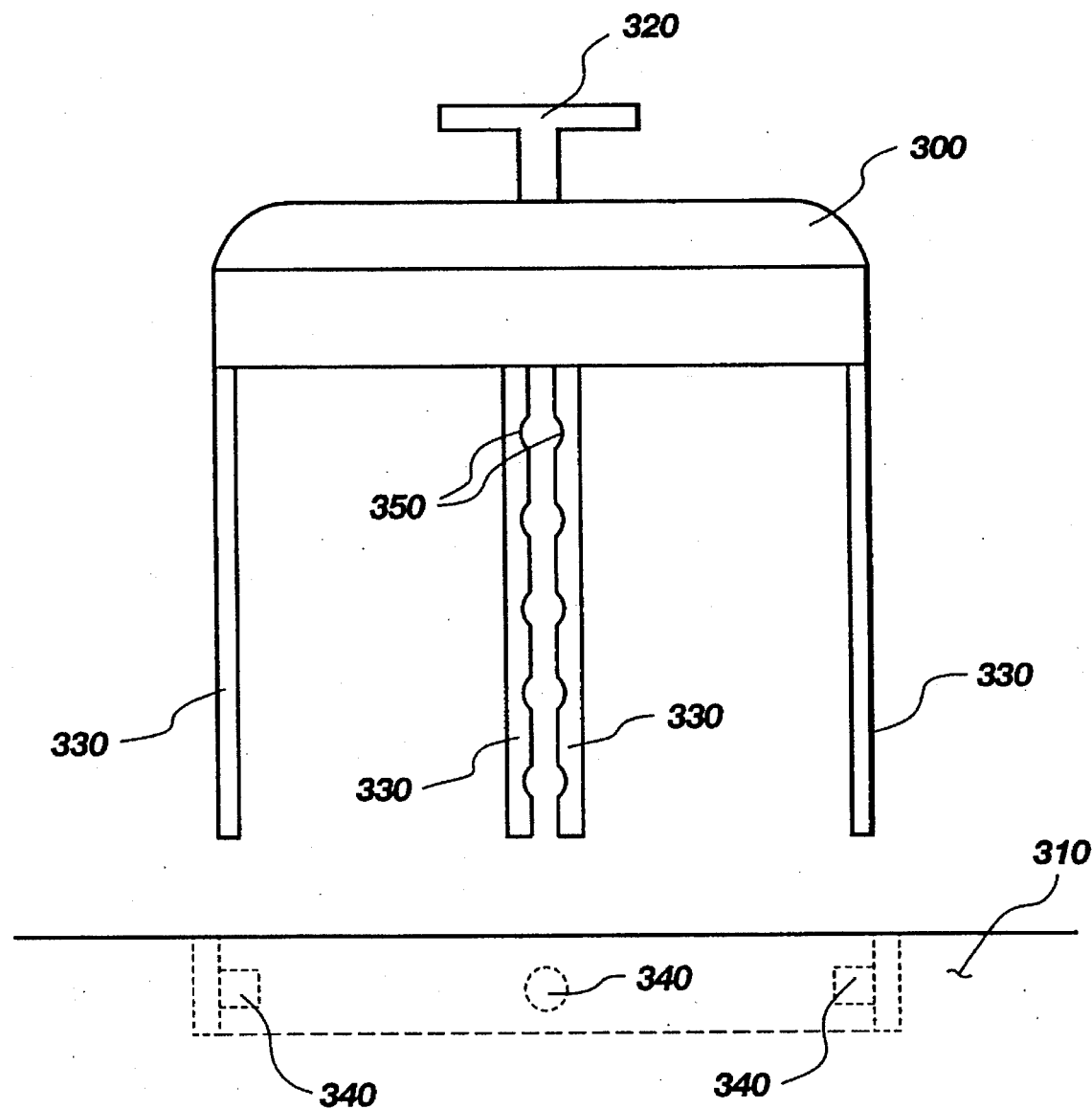
FIG. 6 is an alternative embodiment for an access pore that allows more variable access to the greenhouse interior than the embodiment of FIG. 4, also without removing the access port.

FIG. 6 shows another alternative embodiment for an access port 300 of the present invention. In this embodiment, an access port 300 slides straight up and out of the greenhouse or access port 310 below. T-handles 320 are provided to enable grasping of the access port 300. The engagement mechanisms are pairs of elastic guides 330 that spread apart to allow round nobs 340 projecting horisontally from the top rim of the greenhouse or access port 310 below to alternately spread and then snap around the nobs 340 preventing the access port 300 from sliding up or down without applying force to the T-handles 320. These engagement mechanisms allow for variable degrees of access to the greenhouse interior depending upon which indentation pairs 350 the nobs 340 snap around.

The access port of FIG. 6 enables ventilation of the greenhouse interior while still shielding the plant within. This same function is achieved by the embodiment of FIG. 4, but the amount of ventilation is more variable and ultimately greater in the embodiment illustrated in FIG. 6. The variability of access allows for more than just the ventilation provided by slots of FIG. 4.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A plant shelter that protects a plant within the shelter from conditions of an exterior environment, enables gradual hardening of the plant to said exterior environment, and enables easy and variable access to the plant, said shelter comprising:

a rigid truncated hollow cone comprised of a translucent material, wherein a base of the cone opens into a hollow interior of the cone, wherein a lip at the base protrudes away from the hollow interior, wherein the circumference of the cone at the base is wider than the circumference of the cone at a top, and wherein the top of the cone is covered by the translucent material and has an opening through the top creating a first aperture into the hollow interior of the cone;

a first cap that engages and seals the aperture in the top of the cone, wherein said cap is also comprised of a translucent material, wherein said cap can be removed from the first aperture to allow viewing, ventilation, tool and hand access into the hollow interior of the cone, and wherein the cap also has a an opening through the cap creating a second aperture;

a second cap that engages and seals the second aperture in the first cap, wherein the second cap is also comprised of a translucent material, and wherein the second cap can be removed from the second aperture in the first cap to allow viewing, ventilation, tool and hand access into the hollow interior of the cone without removing the first cap.

2. The plant shelter as defined in claim 1, wherein the translucent material comprising the cone, the first cap and the second cap permits sunlight to pass through into the hollow interior wherein trapped heat from the sunlight creates a thermal buffer to protect a plant covered by the hollow cone.

3. The plant shelter as defined in claim 1, wherein the first aperture through the top into the interior of the hollow cone is threaded.

4. The plant shelter as defined in claim 3, wherein the first cap is threaded to allow threaded engagement between the first cap and the threaded first aperture into the interior of the hollow cone, thereby sealing the first aperture.

5. The plant shelter as defined in claim 1, wherein the second aperture through the first cap is threaded.

6. The plant shelter as defined in claim 5, wherein the second cap is threaded to allow threaded engagement between the second cap and the threaded in the first cap, thereby sealing the second aperture in the first cap.

7. The plant shelter as defined in claim 4, wherein the threading engagement of the first and second caps is perforated by a plurality of horizontal slots that allow air to pass between the greenhouse interior and the exterior environment when the first and second caps are turned to expose said slots.

8. The plant shelter as defined in claim 1, wherein the first and second caps comprise snap-top lids that couple to the top of the greenhouse or another cap respectively by sealing to a protruding lip of said greenhouse or cap.

9. The plant shelter as defined in claim 1, wherein the first and second caps comprise lids with T-handles for gripping the first and second caps and varying an amount of access to the greenhouse interior, wherein elastic guide pairs with a plurality of indentations extend below the caps for meeting in sliding engagement respective circular nobs protruding horizontally from a rim attached to the greenhouse or cap.

10. The plant shelter as defined in claim 6 wherein the threading engagement of the first and second caps is perforated by a plurality of horizontal slots that allow air to pass between the greenhouse interior and the exterior environment when the first and second caps are turned to expose said slots.

* * * * *